United States Patent [19]

Lansing

[11] Patent Number: 4,512,332

[45] Date of Patent: Apr. 23, 1985

[54] STABLE DENSITY STRATIFICATION SOLAR POND

[75] Inventor: Fikry L. Lansing, San Gabriel, Calif.

[73] Assignee: The United States of America as represented by the Administrator of the National Aeronautics and Space Administration, Washington, D.C.

[21] Appl. No.: 542,557

[22] Filed: Oct. 18, 1983

Related U.S. Application Data

[63] Continuation-in-part of Ser. No. 259,208, Apr. 30, 1981, abandoned.

[51] Int. Cl.³ ................................................ F24J 3/02
[52] U.S. Cl. .................................... 126/415; 126/400; 126/900; 126/419; 126/DIG. 1
[58] Field of Search ............... 126/400, 419, 435, 417, 126/452, 450, 900, 415, 440; 165/DIG. 4; 252/73; 165/104.19, 45; 60/641.8, 641.15

[56] References Cited

U.S. PATENT DOCUMENTS

| | | | |
|---|---|---|---|
| 3,077,190 | 2/1963 | Allen | 126/415 |
| 3,372,691 | 3/1968 | Shachar | 126/900 X |
| 4,063,419 | 12/1977 | Garrett | 126/415 |
| 4,066,062 | 1/1978 | Houston | 126/419 X |
| 4,086,958 | 5/1978 | Linder et al. | 126/400 |
| 4,099,558 | 7/1978 | Bricard et al. | |
| 4,109,702 | 8/1978 | Greene | 126/400 X |
| 4,121,567 | 10/1978 | Carson | 126/415 |
| 4,159,736 | 7/1979 | Denis et al. | 126/400 |
| 4,244,351 | 1/1981 | Loeb et al. | 126/415 |
| 4,326,498 | 4/1982 | Eckland | 126/415 |
| 4,328,788 | 5/1982 | Wirguin et al. | 126/400 X |

FOREIGN PATENT DOCUMENTS

| | | | |
|---|---|---|---|
| 2847263 | 5/1979 | Fed. Rep. of Germany | 126/415 |
| 2933792 | 3/1981 | Fed. Rep. of Germany | 126/415 |
| 1179202 | 12/1958 | France | 126/440 |
| 2330971 | 3/1977 | France | 126/415 |

OTHER PUBLICATIONS

"A Cylindrical Blackbody Solar Energy Receiver", *Solar Energy*, Pergamon Press, vol. 18, No. 5, 1976, pp. 395-396.

*Primary Examiner*—Randall L. Green
*Attorney, Agent, or Firm*—Paul F. McCaul; John R. Manning; Thomas H. Jones

[57] ABSTRACT

A stable density-stratification solar pond 10 for use in the collection and storage of solar thermal energy including a container 12 having a first section 14 characterized by an internal wall of a substantially cylindrical configuration and a second section 16 having an internal wall of a substantially truncated conical configuration surmounting the first section in coaxial alignment therewith, the second section of said container being characterized by a base of a diameter substantially equal to the diameter of the first section and a truncated apex defining a solar energy acceptance opening 20. A body 26 of immiscible liquids is disposed within the container and comprises a lower portion 28 substantially filling the first section of the container and an upper portion 30 substantially filling the second section of the container, said lower portion being an aqueous based liquid of a darker color than the upper portion and of a greater density. A protective cover plate 36 is removably provided for covering the acceptance opening.

12 Claims, 5 Drawing Figures

STABLE DENSITY STRATIFICATION SOLAR POND

BACKGROUND OF THE INVENTION

1. Origin of the Invention

The invention described herein was made in the performance of work under a NASA Contract and is subject to the provisions of Section 305 of the National Aeronautics and Space Act of 1958, Public Law 85-568 (72 STAT, 435; 43 USC 2457).

2. Related Applications

This application is a continuation in part application of U.S. patent application, Ser. No. 259,208, filed Apr. 30, 1981, entitled STABLE DENSITY-STRATIFICATION SOLAR POND now abandoned, incorporated herein by reference.

3. Background Discussion

The invention generally relates to solar energy collectors and more particularly to an optimized "natural" solar pond particularly suited for use in capturing and storing solar thermal energy for residential and industrial usage, and providing minimum environmental problems.

DESCRIPTION OF THE PRIOR ART

Solar ponds of the types generally known, utilize "natural" or artificial density stratification facilitated by salty solutions of different concentrations. When exposed to the sun, rays of solar energy progressively penetrate the pond's depth with attendant increase in thermal energy absorption.

This heat-transfer mechanism normally results in a relatively hot, dense bottom solution disposed beneath a relatively cool, dilute upper solution. Density gradients in the pond's depth preferably are designed large enough to stabilize density currents resulting from temperature differences and buoyancy forces. Diffusion at the thermocline boundary layer is considered to be inevitable, particularly during long periods of operation. Additionally, use of salty solar ponds tends to be limited to those areas where there can be found near a point of utilization, high-salinity lakes, seas, swamps, marshes, and so forth, of little environmental use. In such instances, a portion of the salty water beds can be made to serve as a solar pond, particularly where proper concentration levels are maintained. Utilization of man-made salty brine solar ponds, of course, tends to be limited because of the overwhelming operational and maintenance costs involved in such usage, particularly when compared to the low overall efficiency ultimately achieved and environmental problems associated with brine ponds.

The prior art is replete with disclosures of solar-pond collector systems. For example, during the course of a preliminary search conducted with respect to the instant invention, the following patents were discovered U.S. Pat. No. 3,077,190, P. S. Allen; U.S. Pat. No. 3,372,691, S. Shachar; U.S. Pat. No. 4,063,419, Garrett; U.S. Pat. No. 4,066,062, Houston; U.S. Pat. No. 4,086,958, Lindner et al.; U.S. Pat. No. 4,099,558, Bricard et al.; U.S. Pat. No. 4,121,567, Carson; U.S. Pat. No. 4,159,736, Denis et al. None of the references discovered during the course of the search disclose the invention hereinafter described and claimed. However, it is noted that the patent to Garrett U.S. Pat. No. 4,063,419, discloses a method for obtaining solar energy utilizing solar ponds which includes a broad concept of using a dense liquid, such as a brine for solar energy collection and a covering agent, such as a floating oil, or other immiscible fluid or surface-active reagent, as well as an evaporation-inhibiting film in order to minimize or prevent evaporation of the pond liquid. Moreover, the pond liquid may include a dye for enhancing solar thermal energy absorption. It also is noted, however, that the prior art, including the patent to Garrett, clearly fails to disclose a stable, density-stratification, non-brine, solar pond of simplified economic and practical construction, which tends to render such a device suitable for residential and industrial usages.

It is therefore the general purpose of the instant invention to provide a solar thermal energy collector which is particularly designed for enhanced operational efficiency in residential and industrial environments, and in particular has improved power output and may be used efficiently for cooling as well as heating.

OBJECTS AND SUMMARY OF THE INVENTION

It is an object of the instant invention to provide a stable density-stratification solar pond and method for collecting solar thermal energy.

It is another object to provide a solar pond, solar thermal energy collector designed for enhanced operational efficiency.

It is another object to provide an improved solar pond having reduced requirements for continuous maintenance of fluid levels to compensate for evaporation and undesired interface diffusion.

It is another object to provide an optimized, stable density solar pond for use in collecting and storing solar thermal energy for usage in low-temperature Rankine cycle power systems.

It is another object to provide a natural, completely stable, density-stratification, non-brine, solar pond employing two immiscible fluids of different densities combined in a container simulating a cavity radiometer for enhancing the operational efficiency thereof.

These and other objects and advantages are achieved through the use of a container characterized by a generally cylindrical upright interior the uppermost wall of said container having an upper conical segment within which there is defined a solar energy acceptance opening, and a body of liquid disposed within the container consisting essentially of two layers of immiscible, non-brine liquids of mutually differing densities having a boundary layer defined there-between. Some of the unique features of this invention are: (1) that the area of the opening to the surface area of the internal walls is in the range of 1/10 to 1/50, and the opening area is no greater than 50% of the projected area of the container; (2) that the upper liquid is substantially less dense than the lower liquid which is of a color which absorbs solar energy. The "projected area" of the container means the cross sectional area of a plane through the container which results in the maximum area. For example, if the container was a cylindrical sphere, the plane would be through the center of the sphere at the maximum diameter. Typically the upper liquid is at least 20% less dense than the lower liquid. Because of these combined features the pond of this invention is able to reach higher temperatures than conventional systems (for example, 207° F. for the pond of this invention compared to 170° F. for conventional ponds). Moreover, because the liquid is essentially salt free (non-brine), it does not present a pollution problem and is easy to maintain.

DESCRIPTION OF THE PREFERRED EMBODIMENT

Figure 1:
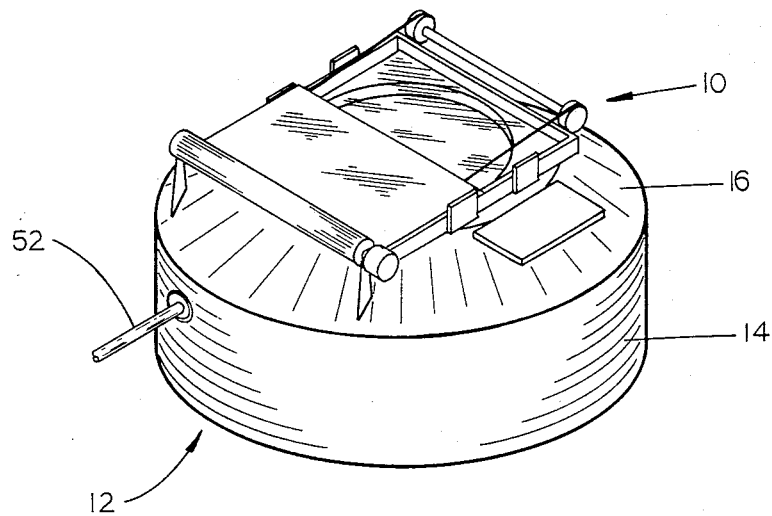
FIG. 1 is a perspective view of a solar pond embodying the principles of the instant invention, which as shown includes a device powered by a solar pond for closing the acceptance apparatus thereof.
Figure 2:
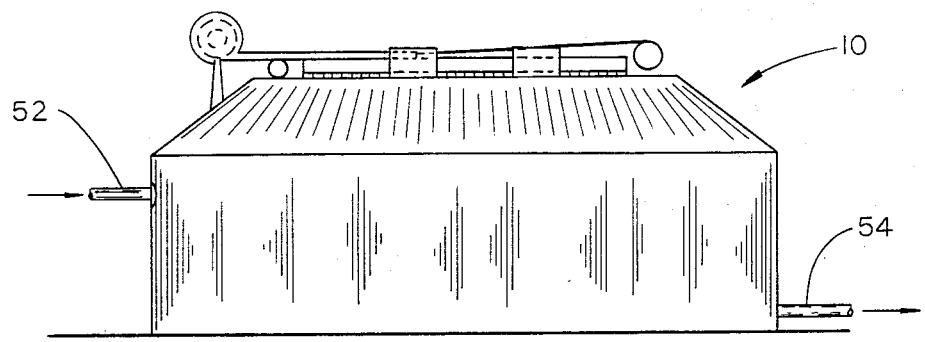
FIG. 2 is a side elevational view of the solar pond shown in FIG. 1 with the solar panel removed for the sake of simplicity.
Figure 3:
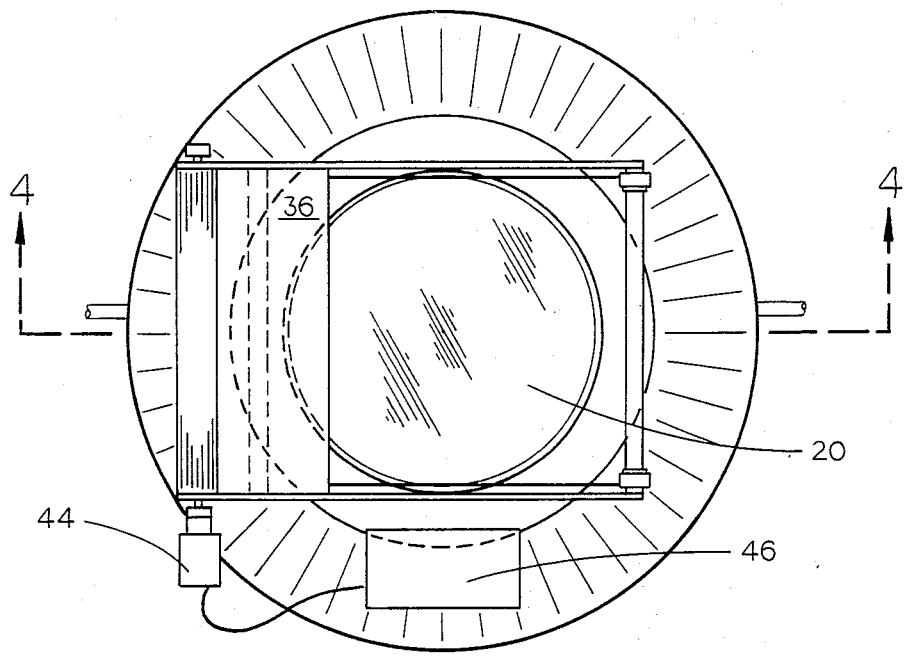
FIG. 3 is a top plan view of the solar pond as shown in FIG. 1.

Referring now to the drawings, wherein like reference characters designate like or corresponding parts throughout the several views, there is shown in FIG. 1 a solar pond, generally designated 10, embodying the principles of the instant invention.

Figure 4:
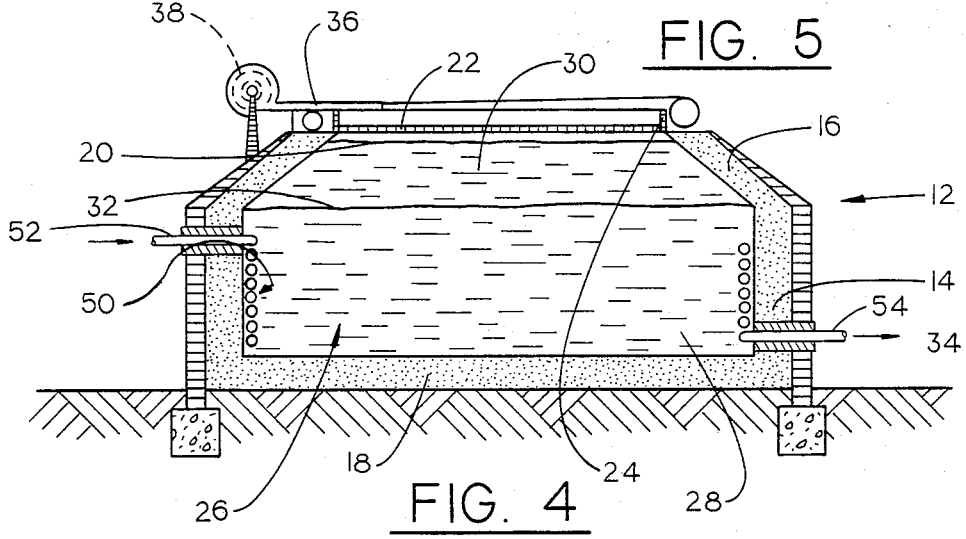
FIG. 4 is a cross-sectional view taken generally along lines 4—4 of FIG. 3.

As shown in FIG. 1, the solar pond 10 includes an upright container 12 having a base segment 14 and a shroud segment 16. As best illustrated in FIG. 4, the internal surface of the base segment 14 is of a generally cylindrical configuration while the internal surface of the shroud segment is of a substantially frusto-conical configuration disposed in coaxial juxtaposition with the base segment. As a practical matter, the container 12 includes a planar bottom segment 18, FIG. 4. Of course, the base segment 14, the shroud segment 16, and the bottom segment 18 are integrally related to form an integral structure. Moreover, within the plane of truncation of the shroud segment 16, there is defined an opening, herein referred to as a solar energy acceptance aperture 20. This aperture is closed by a transparent cover 22 formed of a suitable material, such as thermoplastic polymers and the like. The cover 22 serves as a fluid-evaporation barrier, as well as a barrier to wind, trash, and the like, and is supported by an annular structure, herein referred to as a protective ring 24. The ring 24 circumscribes the opening 20 and is, in turn, supported in a suitable manner.

The ratio of the area of the opening to the internal surface area of the base, shroud and bottom segments is within a range of 1/10–1/50. As the ratio approaches a ratio of 1/50, the pond 10 approaches a black-body configuration of a relatively large volume. Accordingly, the ratio of the areas aforementioned serve to dictate the efficiency of the pond, and the angles of the shroud segment need only to accommodate the establishment of a desired ratio. In this example, the projected area corresponds to the area of base of the container.

Within the container 12, there is disposed a body 26 of immiscible liquids, generally designated 26, FIG. 4. This body of liquids 26 includes a lower liquid 28 which substantially fills the base segment 14 of the container 12, while there is deposited thereon, in a layered relationship therewith, therefore an upper liquid 30 of the body 26. The upper liquid 30 substantially fills the shroud segment 16 with an optimum height between 10 to 50% of the lower liquid. As a practical matter, a boundary layer 32 is defined between the upper and lower liquids 28 and 30, respectively.

It is important here to note that the lower liquid 28 of the body 26 of liquids is of greater density than the upper liquid 30 thereof. To exemplify, the body 26 comprises two immiscible liquids which may, where so desired, include water, glycerol-water or ethyleneglycol-water mixtures or the like as the lower liquid, and oil of paraffin, mixed, and naphthene base, or synthetic fluids such as polyolefins, polyalkylene glycols, silicones, halogenated hydrocarbons or vegetable oils or the like as the upper liquid. Because of their relative immiscibility, relatively widespread availability, low cost, and non-toxicity, oil and water are particularly suited for usage in solar ponds. Brines of differing densities could be used to establish a thermal gradient, but they present serious pollution and maintenance problems and, therefore, are unacceptable.

Figure 5:
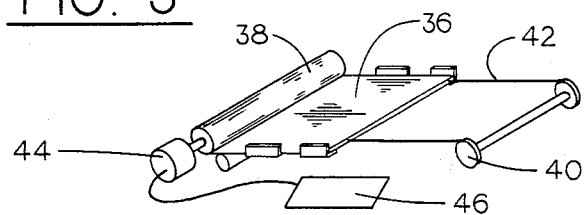
FIG. 5 is a schematic view depicting the device, powered by the solar pond, for deploying a thermally-insulative layer over the solar energy acceptance aperture provided for the solar pond.

Additionally, it is preferred that the lower liquid 28 of the body 26 of immiscible liquid, comprises a water or water of a dark color. Such a color may be imparted thereto through the use of a black dye or any other soluable dye with high absorptivity to the solar energy spectrum. The second portion 30 of the body 26 should be substantially transparent to rays of solar energy with a low extinction coefficient to solar radiation wave lengths. Thus, the upper liquid will act as low absorber and high transmitter to short wavelengths of the solar spectrum band.

Where so desired, a layer of insulation foam, such as may be employed as a blanket 34 about the periphery of the external surface of the container 12. Such is provided as desired in order to minimize thermal energy losses to ambient air, the ground, and the like. Also, where so desired, a thermally insulated cover 36 is provided for preventing loss of thermal energy through the solar energy acceptance opening 20. As a practical matter, the cover 36 is, where desired, formed of a flexible insulative material and stored on a reel 38 in a manner such that the cover 36 may be drawn across the opening 20 in the absence of impinging solar radiation, such as occurs during the night season. A cover typifying that which may be employed is illustrated in FIG. 5. As shown, the cover 36 is connected with spring-loaded take-up reels 40, via cables 42, which are so spring-biased as to draw the cover 36 toward the reels 40. However, as illustrated, a motor 44 is provided for driving a suitable shaft of the reel 38 in order to effect a winding of the cover 36 thereabout. Where so desired, the motor 44 is connected to a solar panel 46, via suitable leads not designated. Where so desired, the solar panel 46 may comprise a simple photocell for closing a circuit switch in order to complete an electrical circuit through the motor 44 to ensure operation of the pond as a solar absorber collector during the sunny hours, and actuate the motion of the cover 36 at night hours, for a complete unattended operation.

It should be appreciated, however, that the panel 46, upon being energized by incident solar radiation, serves to energize the motor 44 for winding the cover 36 about the reel 38, against the forces applied by the reels 40 via the cables 42. In the event the solar panel 46 is shaded from incident solar energy, the motor 44 de-energizes for thus permitting the reel 40 to draw the cover 36 across the solar energy acceptance opening 20. Thus the solar pond 10 is maintained in a suitable condition for receiving solar energy, and yet is protectively covered for inhibiting loss of heat when shaded from incident solar radiation.

In view of the foregoing, it should now be apparent to those familiar with solar ponds, their construction and usages and the like that the relative thicknesses of the first and second portions 28 and 30 of the body 26 of liquids, the index of refraction and transmissivity coefficients of the upper and lower density liquids, as well as the thermal and physical properties of the liquids and the color of the bottom, higher density fluid can be varied in a manner well within the skill of the art. Such variations, of course, tend to reduce convection currents at the boundary layer 32 while the thermal storage characteristics of the pond are enhanced. Moreover, through the use of the transparent cover 22, the immiscible liquids forming the first and second portions of the body 26 of liquid can be maintained in a calm condition for thus further reducing the chances of developing vertical convection currents.

Finally, the pond is provided with a heat transfer system 50. As shown, an inlet 52 and an outlet 54 for a coil 56 circumscribing the lower portion of the pond is provided. Suitable fluids such as organic fluids known as R-11 and R-113 serve quite satisfactorily as both heat transfer fluid and as a working fluid for a low-temperature Rankine cycle system.

OPERATION

It is believed that in view of the foregoing description, the operation of the invention herein disclosed and claimed readily is apparent, however, in the interest of completeness, the operation of the invention herein disclosed and claimed is, at this point, briefly reviewed.

With the solar pond 10 having deposited within the container 12 a body 26 of immiscible liquid, as hereinbefore described, the device is ready for operation simply by removing the cover 36, manually or mechanically.

As rays of solar energy are accepted at the solar energy acceptance opening 20, solar rays characterized by relatively short wave lengths, 0.3-3 microns, penetrate the transparent upper liquid 30 of the liquid body 26, passing through the boundary layer 32. The solar thermal energy now is absorbed in the lower liquid 28 of the body 26 of immiscible liquids. Thus the temperature of the lower liquid 28 rises. As the temperature of the lower liquid 28 rises, it begins to radiate thermal energy, a small quantity of the radiation being of a wave length to which the upper liquid 30 of the body 26 is transparent, while a much larger quantity of the radiation is of a wave length to which the upper liquid 30 of the body 26 is opaque. Thus a major portion of the radiation is trapped in the lower liquid of the pond.

Due to the differing densities of the first and second portions 28 and 30, respectively, of the body 26 of immiscible liquids, the upper and lower liquids 28 and 30 respectively tend to remain separated along the boundary layer 32. Of course, as the thermal energy of short wave lengths is radiated from the upper liquid 30 of the body 26 of immiscible liquids, the radiation strikes the internal surface of the shroud segment 16 and is re-reflected back toward the lower liquid 28 of the body 26 of liquids.

Thus the thermal energy is, in effect, trapped due to the opacity of the body 26 as well as the geometry of the internal surfaces of the container 12, in much the same manner as radiation is trapped within the cavity of a black body. Consequently, the lower liquid 28 of the body 26 of immiscible liquids is, in operation, maintained as a "hot" fluid relative to the upper liquid 30 of the body. Thus solar thermal energy is trapped within the pond 10 and the energy thus stored is usable as thermal energy for heating, cooling, or power generation in residential and industrial usages.

In order to utilize the thermal energy thus collected and stored, a suitable heat transfer fluid is circulated through the heat transfer system 50 for conveying thermal energy from the pond 10 to a system, such as a low-temperature Rankine cycle power system, not shown.

In view of the foregoing, it is believed to be readily apparent that the solar pond 10 provides a practical solution to the problems heretofore encountered by those engaged in the design of devices and systems intended to function as solar thermal energy collectors.

What is claimed:

1. A stable, density-stratification solar pond comprising:
   (a) a cylindrical container having light opaque walls and, in its upper segment, a truncated conical shape converging toward a solar energy acceptance opening facing toward the sun, said opening having an area which is small relative to the surface area of the internal walls of the container, with the ratio of the area of the opening to the surface area of all of the internal walls being in the range of 1/10 to 1/50, and said opening area being no greater than 50% of the projected area of the cylindrical container, said ratio of said aforementioned areas approaching a black-body configuration for said solar pond; and
   (b) a body of liquids of mutually differing densities disposed within said container, said liquids comprising two separate layers of non-brine, immiscible liquids, the upper layer being organic based and substantially contained within said truncated conical segment, and the lower layer being aqueous based about 80% more dense than said upper layer and essentially contained within said cylindrical container, with the upper layer being transparent to solar radiation and the lower layer being a dark color for high absorptivity of said solar radiation.

2. An improved density-stratification solar pond for collecting and storing solar thermal energy comprising:
   (a) a container having light opaque walls and a first section of a substantially cylindrical shape surmounted by a second section of a truncated conical shape having a solar energy acceptance aperture defined at its truncated apex, said aperture having an area which is small relative to the surface area of the internal walls of the container, with the ratio of the area of the opening to the surface area of all of the internal walls being in the range of 1/10 to 1/50, said ratio substantially conforming said pond to a block-body configuration, and said opening area being no greater than 50% of the projected area of said first section of the container;
   (b) a lower body of aqueous based liquid disposed within said lower cylindrical section of said container; and
   (c) an upper body of non-brine, organic based liquid disposed within said upper conically-shaped portion of said container in superimposed relation with said lower body, the fluid of said lower body being characterized by a density about 80% greater than the density of the fluid of said upper body, and the fluid of said upper body being characterized as substantially transparent to rays of solar energy with a low extinction coefficient to solar radiation wavelengths.

3. A solar pond as defined in claim 2 wherein the fluid of said first and second bodies of fluid comprise a body of immiscible fluids.

4. A solar pond as defined in claim 3 wherein the fluid of said second body is substantially transparent to solar radiation and substantially opaque to radiation given off by said first body as thermal heating thereof occurs.

5. A solar pond as defined in claim 4 wherein the fluid of said first body comprises a fluid opaque to light characterized by a propensity to absorb solar thermal energy.

6. A solar pond as defined in claim 5 further comprising a cover plate seated over said aperture and formed of a material substantially transparent to solar radiation.

7. A solar pond as defined in claim 6 further comprising means for insulating said container against loss of thermal energy.

8. A solar pond as defined in claim 7 wherein said solar pond further comprises means responsive to changes in intensity of solar radiation for depositing a layer of thermal insulating material over said aperture.

9. A stable density-stratification solar pond for use in the collection and storage of solar thermal energy, comprising:
 (a) a container having light opaque walls and with a lower section having an internal wall of a substantially cylindrical configuration and an upper section having an internal wall of a substantially truncated conical configuration surmounting said lower section in coaxial alignment therewith, said upper section being characterized by a base of a diameter substantially equal to the diameter of the lower section and contiguously related thereto, and a solar energy acceptance opening defined in the plane of truncation of the conical section thereof, said opening having an area which is small relative to the surface area of all of the internal walls of the container, with the ratio area of the opening to the surface area of all of the internal walls being in the range of 1/10 to 1/50, said ratio substantially conforming said pond to a black-body configuration, and said opening area being further characterized as no greater than 50% of the projected area of the cylindrical lower section of the container;
 (b) a body of two non-brine immiscible liquids disposed within the container comprising an upper liquid substantially filling said upper section of said container and a lower liquid substantially filling said lower section of the container, said lower liquid being characterized as a water-type liquid of a dark color and a density greater than the upper liquid, and said upper liquid is characterized as an oil-like-type which is transparent to solar radiation, said upper liquid is further characterized as about 20% less dense than said lower liquid and acts as a low absorber to solar radiation and as a high transmitter to short wavelengths of the solar spectrum band, and
 (c) an insulative cover plate retractably mounted on the second section of said container in relation with said acceptance opening.

10. In a method for collecting and storing solar thermal energy comprising the steps of:
 (a) introducing solar thermal energy into a body of fluid confined in a container including a cylindrically shaped portion, said container having light opaque walls and a solar energy acceptance opening, said container arranged to approach a blackbody configuration, said acceptance opening having an area which is small relative to the surface area of the internal walls of the container, with the ratio of the area of the opening to the surface area of all of the internal walls being in the range of 1/10 to 1/50, and said opening area being no greater than 50% of the projected area of the cylindrically shaped portion;
 (b) said body of fluid being characterized by a lower portion of water and an upper portion of oil and an interface defined therebetween, said lower portion being characterized by a dark color adapted to absorb thermal energy, and said upper portion being a non-brine oil liquid substantially transparent to solar radiation;
 (c) reflecting off of the upper portion of said body back to the lower portion thereof, a first portion of thermal radiation given up by said lower portion of said body of fluid as the temperature thereof is raised in response to acceptance of solar thermal energy transmitted by said upper portion to the lower portion of the body;
 (d) reflecting off the walls of said container back to said upper portion of said body of fluid, a second portion of thermal radiation given up by said lower portion of said body and transmitted by the upper portion of the body of fluid to trap thermal energy in said lower portion of the body of fluid; and
 (e) removing the thermal energy from the lower portion of the body through a heat exchange medium conducted through the lower portion of the fluid.

11. In a method as defined in claim 10 wherein the lower portion of the body of fluid is of a density about 80% greater than the density of the upper portion.

12. In a method as defined in claim 11 wherein said heat exchange medium comprises an organic fluid suitable for use in a low-temperature Rankine cycle system.

* * * * *